May 12, 1970  H. KONET  3,512,020
GYROSCOPIC-TYPE MOTOR
Filed Feb. 28, 1968
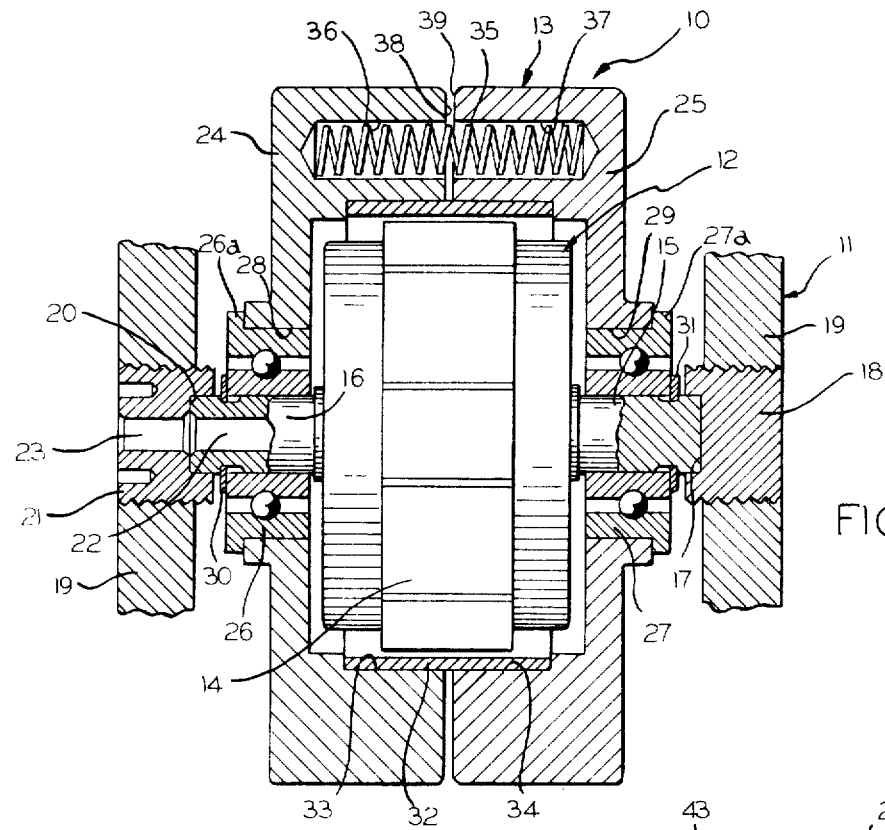
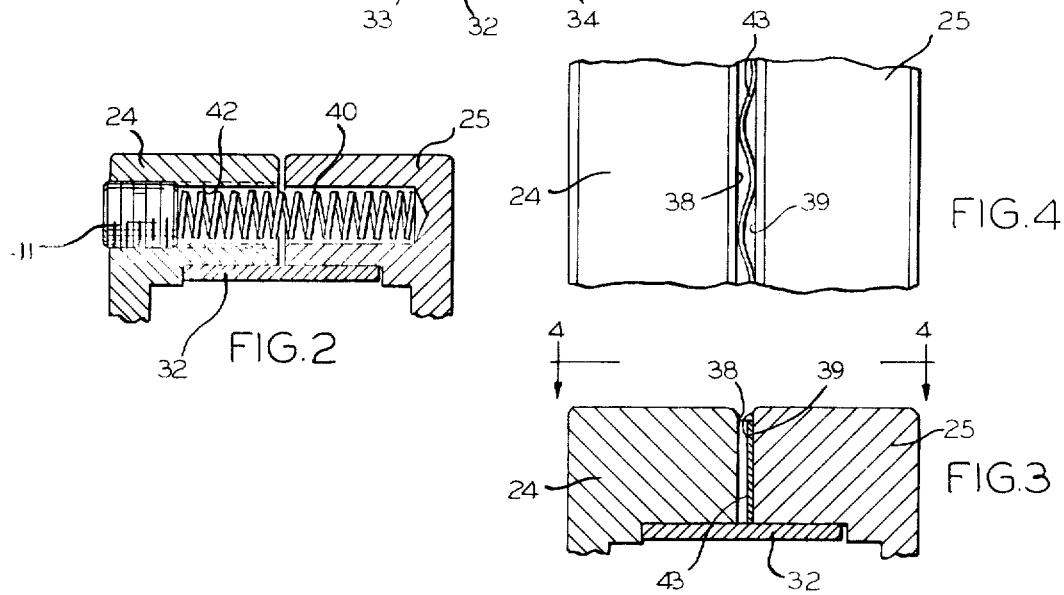
INVENTOR
HENRY KONET
BY
Mazall, Johnston, Cooke & Root
ATTORNEY

# United States Patent Office 3,512,020
Patented May 12, 1970

3,512,020
GYROSCOPIC-TYPE MOTOR
Henry Konet, Ho Ho Kus, N.J., assignor to R. C. Allen Business Machines, Inc., Grand Rapids, Mich., a corporation of Michigan
Filed Feb. 28, 1968, Ser. No. 708,887
Int. Cl. H02k 7/02
U.S. Cl. 310—67                               8 Claims

ABSTRACT OF THE DISCLOSURE

Gyroscopic motor having a fixed stator and a rotor of two substantially identical halves that may be spring loaded.

---

This invention relates in general to a gyroscopic motor for use in gyroscopic instruments, and more particularly to an induction-type gyroscopic motor capable of longer life and of operating with stability under a wide temperature range.

The gryroscopic motor of the present invention is constructed with symmetrical parts which enable stability, and includes a stator having opposed shafts set in a gimbal, and a rotor coacting with the stator and bearingly mounted on the shafts. The mounting of the motor on the gimbal is simple and symmetrical with a small number of parts and the mounting stresses are isolated from the bearings of the rotor. Moreover, the motor may be easily repaired. The rotor includes substantially identically shaped, cup-shaped that are symmetrically constructed and each provided with a bearing that is freely received on the shafts of the stator. Restraining means are provided on the shafts to limit the movement of the bearings and rotor halves outward away from the stator, and spring means is provided between the rotor halves to effect a preload on the rotor halves and bearings to maintain the rotor in proper oriented relationship to the stator at all times. A hysteresis ring is press fitted into one of the rotor halves and provided for slip fit relationship with the other rotor half.

The spring means may be of any suitable type. For example, blind bores may be provided in the facing portions of the rotor halves to receive coil springs having a predetermined spring rate. In the event that it is desired to be able to adjust the spring rate, the bore of one-half may be fitted with a threaded spring bottoming member that is adjustable from the outside of the rotor. Another suitable form of spring means would be a spring washer, such as the "Belleville" type which would be arranged between the opposing faces of the rotor halves.

Accordingly, it is an object of the present invention to provide a new and improved gyroscopic type motor for gyroscopic instruments that may be economically constructed, while provided with symmetry and stability.

Another object of this invention resides in the provision of a gyroscopic motor including symmetrically formed rotor halves that may be spring loaded.

Still another object of this invention is in the provision of a gyroscopic motor constructed in order to simplify its attachment to a gimbal, whereby gimbal mounting stresses are isolated from the bearing fittings of the rotor.

Other objects, features and advantages of the invention will be apparent from the following detailed disclosure, taken in conjunction with the accompanying sheet of drawing, wherein like reference numerals refer to like parts, in which:

FIG. 1 is an axial sectional view taken through the gryroscopic motor of the present invention showing some parts fragmented, and some parts in elevation and partially broken away from purposes of clarity;

FIG. 2 is a fragmentary detailed sectional view of a modified rotor spring preload arrangement;

FIG. 3 is a view similar to FIG. 2 showing still another modification of the invention; and FIG. 4 is a fragmentary view of the embodiment of FIG. 3, taken substantially along the line 4—4 thereof.

Referring now to the drawings, and particularly to the embodiment of FIG. 1, the gyroscopic motor of the present invention is generally indicated by the numeral 10, and is shown to be mounted in a gimbal 11. The motor generally includes a stator 12 fixed to the gimbal 11, and a rotor 13.

The stator 12 includes an armature 14 having coaxially aligned and oppositely extending shafts 15 and 16. The shaft 15 is received in a socket or blind bore 17 of a gimbal mounting 18 threadedly received in a frame 19. The opposing shaft 16 is received in a counterbore 20 of a gimbal mounting 21 that is also threadedly received in the frame 19. An opening 22 in the shaft 16 is aligned with an opening 23 in the gimbal mounting 21 to receive connecting wires from the stator to be connected to a suitable source of electrical power. The wires are not shown for purposes of clarity. Thus, the gimbal mountings 18 and 21 position the stator 12 in the gimbal 11.

The rotor 13 is sectional and includes symmetrical halves 24 and 25 that are cup-shaped to coact and form a cavity for the stator 12. Each rotor half 24 and 25 is respectively provided with a bearing 26 and 27 that bearingly mounts the rotor halves to the stator shafts 15 and 16. While any type of bearing may be provided, the bearings shown are of the ball bearing type, and are respectively press fitted into bearing openings 28 and 29 of the rotor halves 24 and 25. Flanges 26a and 27a are additionally provided on the bearings 26 and 27 to bear against the outer sides of the rotor halves. The bearings are provided with a slip fit or free fit on the shafts of the stator, and restraining means in the form of snap rings 30 and 31 are mounted on the shafts to limit the movement of the rotor halves and bearings outward away from the stator and to prevent their engagement with the gimbal mountings. A hysteresis ring 32 or squirrel cage assembly, depending on the type of motor, is press fit into a counterbore 33 of the rotor half 24 and slip fitted in the counterbore 34 of the rotor half 25.

In order to spring load the rotor halves 24 and 25, spring means is provided between the rotors to urge them against the restraining snap rings 30 and 31. In the embodiment of FIG. 1, this spring means is in the form of a plurality of coil springs 35 having a predetermined spring rate. Any suitable number of springs 35 may be provided in circumferentially spaced relation to give the desired spring load. If a coil spring 35 is received in opposed and aligned blind bores 36 and 37 of the rotor halves 24 and 25, the blind bores are provided in the opposed faces 38 and 39 of the rotor halves. Thus the coil springs are bottomed in the blind bores of each of the rotor halves.

In the embodiment of FIG. 2, the spring means is modified whereby the coil springs 40 may have their spring rate adjusted by means of a threaded setscrew 41 that is received in one of the rotor half bores which is threaded at 42. Otherwise the embodiment will function the same as the embodiment of FIG. 1.

The embodiment of FIGS. 3 and 4 differs from the embodiment of FIG. 1 only in that a modified spring means is provided for preloading the rotor halves. In this embodiment, a spring washer 43 is arranged between the opposed faces 38 and 39 of the rotor halves. This spring washer may be of the "Belleville" type and will serve to provide an equal spring loading around the rotor halves. It should be appreciated that the spring loading will enable longer life and accommodate to temperature differential problems.

In the event that the gyroscopic motor of the present invention is intended for a high vibration installation, the rotor halves may be provided with a solid preload by freezing the slip fit of the hysteresis ring 32 with respect to the rotor half 25. This spring fit may be frozen with adhesive or equivalent material upon completion of motor run-in or adjustment whereupon the screws and springs (as in the case of the embodiment of FIG. 2) may be thereafter removed.

It should further be appreciated that the motor of the present invention may be easily repairable and that its structure permits ease of mounting with respect to the gimbal. Further, the mounting stresses of the gimbal are isolated from the rotor bearings to further enhance the stability and operation of the rotor. Provision may be made to adjust for the desired preload, which can be measured by a suitable instrument or by a predetermined rundown time.

It will be understood that modifications and variations may be effected without departing from the scope of the novel concepts of the present invention.

The invention is hereby claimed as follows:

1. A gyroscopic motor mounted on a gimbal comprising a fixed stator and a rotor, said stator having axially aligned shafts extending from opposite sides and received at the outer free ends by gimbal mounts of said gimbal, said rotor including substantially identical and symmetrical cup-shaped halves concentrically enclosing said stator, a bearing fixed to each rotor half and freely received on one of said shafts between the stator and adjacent gimbal mount, restraining means on said shafts coacting with said bearings to limit movement thereof away from the stator, and spring means between the rotor halves loading same against said restraining means.

2. A gyroscopic motor as defined in claim 1, and a hysteresis ring within said rotor halves, one end of said ring being fixed in one-half and the other having a slip fit with the other rotor half.

3. A gyroscopic motor as defined in claim 2, wherein aligned and facing blind bores are provided in said halves and said spring means includes a plurality of coil springs bottomed in said bores.

4. A gyroscopic motor as defined in claim 2, wherein said spring means is adjustable to enable changing of the load on said restraining means.

5. A gyroscopic motor as defined in claim 2, wherein said spring means includes a spring washer.

6. A gyroscopic motor as defined in claim 5, wherein said spring washer is of the "Belleville" type and is arranged between the opposing faces of said rotor halves.

7. A gyroscopic motor comprising a fixed stator and a rotor, said stator including axially aligned shafts extending from opposite sides, said rotor including substantially identical halves, a bearing fixed to each rotor half for mounting same on one of said shafts, restraining means on said shafts coacting with said bearings to limit movement thereof away from the stator, and spring means between said rotor halves spring loading same against said restraining means, said spring means including a plurality of coil springs.

8. A gyroscopic motor as defined in claim 7, and means for adjusting the spring means.

References Cited

UNITED STATES PATENTS

| 2,653,481 | 9/1953 | Mathiesen | 74—5.37 |
| 2,772,046 | 11/1956 | Shomphe | 310—67 X |
| 2,776,088 | 1/1957 | Wentling | 310—67 X |
| 2,854,188 | 9/1958 | Shomphe | 310—67 X |
| 2,929,944 | 3/1960 | Shewmon | 310—67 X |

MILTON O. HIRSHFIELD, Primary Examiner

M. O. BUDD, Assistant Examiner

U.S. Cl. X.R.

74—5.7; 310—74